UNITED STATES PATENT OFFICE.

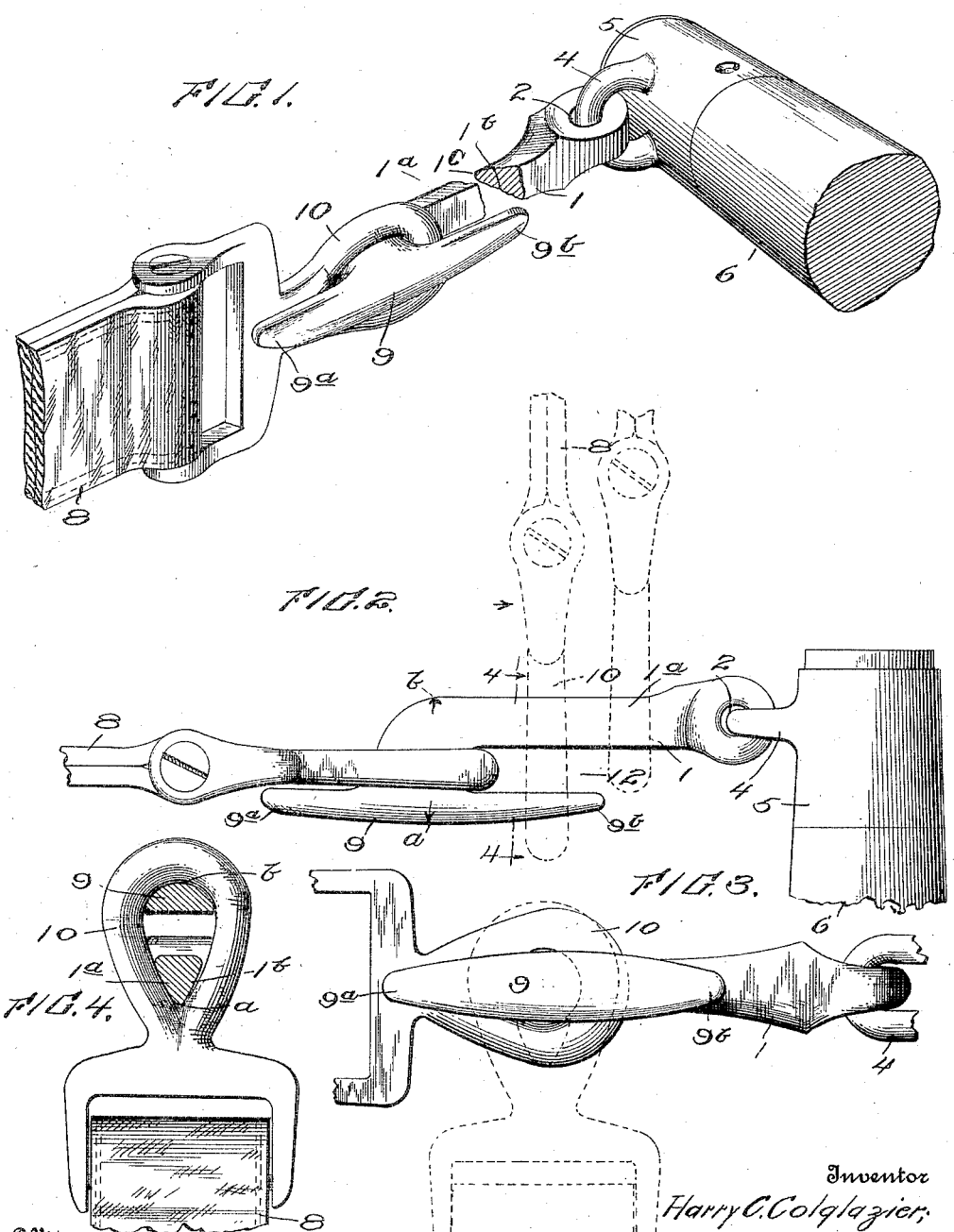

HARRY C. COLGLAZIER, OF LARNED, KANSAS.

WHIFFLETREE-HOOK.

1,078,418.     Specification of Letters Patent.     Patented Nov. 11, 1913.

Application filed July 22, 1913. Serial No. 780,441.

*To all whom it may concern:*

Be it known that I, HARRY C. COLGLAZIER, a citizen of the United States, residing at Larned, in the county of Pawnee and State of Kansas, have invented certain new and useful Improvements in Whiffletree-Hooks, of which the following is a specification.

My invention relates to improvements in whiffletree hooks; and the main object of the invention is to provide a hook which cannot become accidentally disconnected from the cockeyes of the trace or tug.

The invention will be more readily understood by reference to the accompanying drawings, forming a part of this specification, in which—

Figure 1, is a perspective view of my improved whiffletree hook showing the manner in which it is connected to the end of a swingletree and to a tug; Figs. 2 and 3 are top plan and side elevations, respectively, of the same; and Fig. 4, is a vertical section on the line 4—4 of Fig. 2.

The whiffletree hook 1, is preferably provided with an eye 2, through which passes a vertically disposed loop 4, projecting from a thimble or sleeve 5 upon the end of the swingletree 6. This manner of fastening the hook forms a very flexible connection between the swingletree and the trace or tug 8, because it permits both a vertical and a lateral swinging to the usual rigid hook, permitting a straight pull at all times and preventing any transverse strain tending to bend or distort the hook.

The principal features of my improvements consist in making the shank of the hook triangular or wedge-shape in cross-section, the top and bottom faces $1^a$, $1^b$ slanting toward the edge $1^c$; providing the head 9, of the hook with extended ends or prongs $9^a$, $9^b$; and making the distance across the hook from the point $a$, on the head to the point $b$, upon the opposite side of the shank substantially equal to the length of an ordinary cockeye 10. It is also preferable to round the outer side of the head 9, to conform to the curvature of the larger end of the cockeye.

By referring to Fig. 4, it will be seen that the cockeye can be slipped over the head of the hook only by turning it sidewise with the inner V-shaped end of loop extending outwardly toward the apex of the wedge-shaped shank. The cockeye must be pushed inwardly along the shank, as indicated in dotted lines in Fig. 2, until it has passed over the end $9^b$ of the head before it can be swung around into the normal working position shown in full lines.

It is practically impossible for the cockeye to become accidentally disengaged from the hook after it is in normal working position, due to the slackening of the tugs or from any other cause. The extended end $9^a$ prevents it from swinging inwardly toward the left. If the cockeye swings around to the left and moves inwardly along the channel or space 12 between the adjacent inner sides of the shank and head, it cannot then slip over the head until it is shifted laterally toward the end $9^b$ and placed in a position substantially at right angles to the shank while it is being placed over the end $9^a$ and maintained perpendicular to the shank as it is slid off the hook; for it will be observed that, inasmuch as the outer faces of the head 9 and wedge-shaped shank 1, conform to the configuration of the loop in the cockeye as indicated in Fig. 4, the parts will bind and lock just as soon as the cockeye is shifted into an angular position until it has passed over the outer end of the shank. This binding or locking of the parts when the parts are shifted from a perpendicular arrangement, during the threading of the cockeye over the hook, furnishes an added feature of safety in preventing accidental separation.

It sometimes happens that the swingletrees rest upon the ground, as when the swingletrees are fastened to a doubletree or to the end of a wagon-pole and when the horses are standing still or being hitched, they may step on the whiffletree hooks. Since the head 9 is turned edgewise and extends parallel with the shank, the extensions $9^a$, $9^b$, will not be bent or distorted when trampled upon and moreover cannot injure the hoofs of the horses.

I have described in detail the particular construction illustrated in the accompanying drawings for the purpose of disclosing an embodiment of my invention, but I am aware that changes may be made therein without departing from the spirit of my invention.

I claim:—

1. A whiffletree hook, comprising a shank wedge-shaped in section, and a head having oppositely extending ends or prongs parallel with the shank.

2. A whiffletree hook adapted to engage the opening of the usual cockeye of a tug, comprising a shank, and a head having oppositely extending ends or prongs parallel with the shank, the distance between the outer edges of the shank and the head being slightly less than the length of the opening of the cockeye.

3. A whiffletree hook adapted to engage the usual cockeye of a harness tug, comprising a shank having a wedge-shaped outer side, and a head having oppositely extending prongs, the distance across the hook from the outer side of the shank to the opposite outer side of the head being slightly less than the length of the cockeye.

4. A whiffletree hook adapted to engage the usual cockeye of a harness tug, comprising a shank having a wedge-shaped outer side, and a head having oppositely extending prongs, the outer contour of the head conforming substantially to the larger end of the opening of the cockeye.

In testimony whereof I affix my signature in presence of two witnesses.

HARRY C. COLGLAZIER.

Witnesses:
A. A. DOERR,
ED. S. LINDOS.

Copies of this patent may be obtained for five cents each, by addressing the "Commissioner of Patents, Washington, D. C."